March 27, 1956  E. E. MARTIN  2,739,856
FLEXIBLE BODIED SEAL UNITS
Filed April 29, 1955
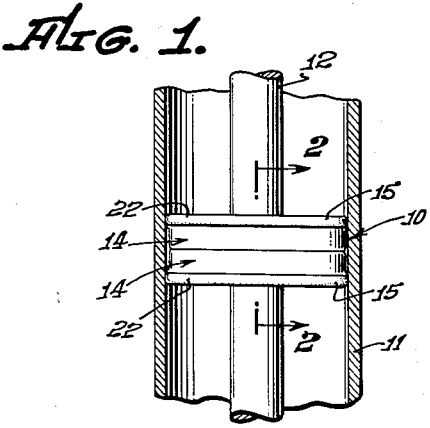
Fig. 1.
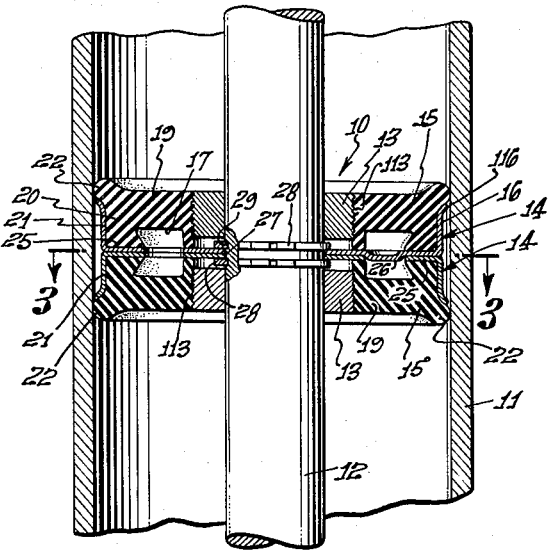
Fig. 2.
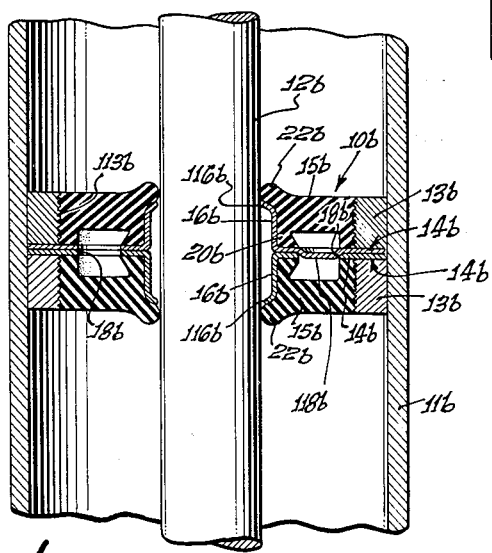
Fig. 6.
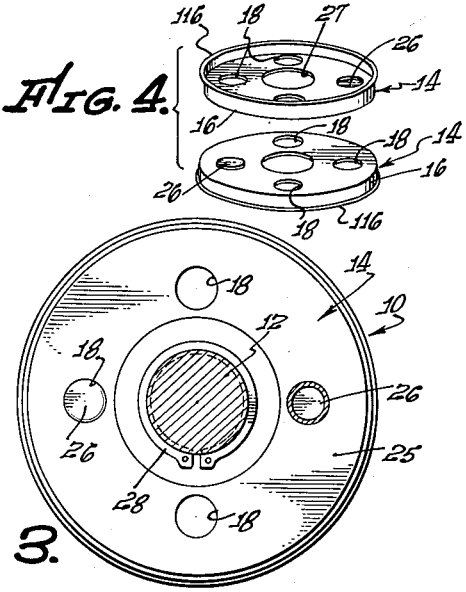
Fig. 4.
Fig. 3.
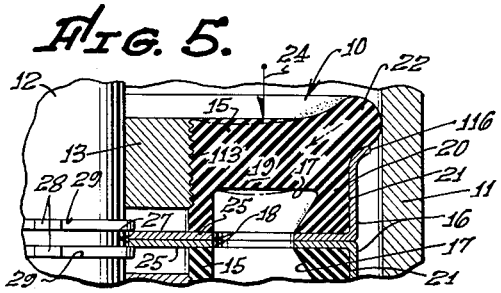
Fig. 5.
EARNEST E. MARTIN,
INVENTOR.
BY William P. Green
ATTORNEY.

United States Patent Office 2,739,856
Patented Mar. 27, 1956

2,739,856

FLEXIBLE BODIED SEAL UNITS

Earnest E. Martin, Glendora, Calif., assignor to Ralph W. Walsh, Westminster, Calif.

Application April 29, 1955, Serial No. 504,982

13 Claims. (Cl. 309—23)

This invention relates to improved seal units for forming a fluid tight seal between a pair of relatively movable members. The invention is in certain respects particularly applicable to the construction of piston units, for assuring the maintenance of a most effective sealing engagement with a coacting cylinder.

A sealing unit or piston embodying the invention is of a type including two bodies of elastomeric material, such as rubber, at opposite sides of the unit, these bodies having a pair of sealing lips for annularly engaging a coating cylinder or member. Most prior units of this general type have been less satisfactory than would be desired by reason of the difficulty of maintaining a proper seal under varying pressure conditions, while at the same time assuring against excessive friction or binding. This difficulty has resulted because any increase in pressure against such a rubber bodied seal member or piston tends to expand or flex the rubber tightly against the engaged cylinder or member, with a resultant excessive increase in friction which has both increased the wear on the unit and decreased its operating efficiency.

My copending application Ser. No. 486,618, filed February 7, 1955, now Patent No. 2,709,118, issued May 24, 1955, on "Seals for Pistons, Fluid-Tight Joints, and the Like" has disclosed a unique type of rubber bodied piston or seal unit which overcomes this tendency for excessive friction, by causing the pressure to apply a counteracting force to the lip or lips, in a manner such that the sealing force exerted by the lips remains very light but effective through a wide range of fluid pressures. This result is attained by providing an elastomeric body or bodies having a flexible radially extending wall which flexes axially to a greater extent than an attached lip carrying portion of the body, and which as a result of such flexure applies a force to the sealing lip or lips in a direction away from the engaged sealing surface.

The present invention has to do with improvements in the type of sealing unit disclosed in my above-mentioned application, and particularly to an improved type of backing plate structure for backing up and properly confining the elastomeric material. In a unit embodying the invention, I employ two transverse rigid backing plates received axially between a pair of elastomeric bodies of the defined type, the plates being so formed as to both support the bodies axially and confine them radially. For these purposes, the two plates have first radially extending portions received between and backing up the two elastomeric bodies, and second axially extending flange portions extending in opposite axial directions alongside the elastomeric bodies at locations to confine them against unwanted radial flexure between the two sealing lips. The radial portions of the plates may contain registering apertures through which a pair of internal recesses in the two bodies are in communication. The two plates are desirably maintained in fixed rotary positions, to thus maintain the apertures in registry, preferably by means of a lug or lugs carried by one or both of the plates and receivable within an aperture in the other plate.

When the sealing unit is a piston, the axial portions of the backing plates extend axially along the radially outer sides of the elastomeric bodies. The plates and elastomeric bodies may be carried by a piston rod, with the plates being positioned on the rod by a pair of snap rings received within grooves in the rod. The elastomeric bodies may be held on the rod by a pair of hub elements which are desirably pressed fits on the rod at opposite axial sides of the backing plates and snap rings.

The above and other features and objects of the present invention will be better understood from the following detailed description of the typical embodiments illustrated in the accompanying drawing, in which:

Fig. 1 is a section through an elevational view of a piston and cylinder apparatus, in which the piston is constructed in accordance with the present invention;

Fig. 2 is an enlarged section taken on line 2—2 of Fig. 1;

Fig. 3 is a transverse section taken on line 3—3 of Fig. 2;

Fig. 4 is an exploded perspective view of the two backing plates of the piston;

Fig. 5 is an enlarged fragmentary section corresponding to Fig. 2, but showing the piston in the condition to which it is deformed when fluid pressure is applied thereto; and Fig. 6 is a view corresponding to Fig. 2, but showing a variational form of the invention.

Referring first to Figs. 1 to 5, I have there shown a piston unit 10 formed in accordance with the invention, and illustrated in operative position within an associated cylinder 11. The piston structure is carried about an externally cylindrical piston rod 12, and is movable axially with the rod relative to the cylinder. In use, fluids in the cylinder at opposite sides of the piston exert pressure axially against the piston, which pressure may vary within a very substantial range.

The piston is formed of a number of annular parts, including two inner hub elements or sleeves 13, two reinforcing or backing plates 14, two body members 15 formed of elastomeric material such as rubber, and two snap rings or clips 28. Hub elements 13 are rigid, typically being formed of metal, and may be pressed fits on rod 12, to be frictionally held in fixed positions relative to the rod. The outer essentially cylindrical surfaces 113 of elements 13 may be serrated or otherwise irregularized (see Figs. 2 and 5) with elastic body members 15 being vulcanized directly and continuously to these serrated surfaces. Such vulcanizing of the elastomeric bodies to elements 13 positively bonds the inner portions of bodies 15 in fixed relation to elements 13 and the piston rod.

Backing plates 14 are annular and rigid, typically being formed of rigid metal and having main flat or planar portions 25 extending radially outwardly and directly transversely of the shaft from a location between the two elements 13. The two elastic bodies 15 are positioned at opposite sides of these main portions 25 of backing plates 14, to be axially backed up or retained thereby in essentially their illustrated positions. Each of the bodies 15 contains an annular recess 17 facing axially toward the corresponding recess in the other body 15, and communicating therewith through apertures 18 in backing plates 14. By virtue of the provision of these recesses 17 within the bodies 15, these bodies form a pair of essentially radially extending elastic annular walls 19, which are adapted to be flexed axially inwardly toward recesses 17 by fluid pressure exerted against the opposite axial sides of piston assembly 10. Radially outwardly beyond recesses 17 the elastic bodies 15 have annular portions 20 which extend axially along the outer sides of recesses 17 and into direct abutting engagement with backing plates 14, so that the walls 19 axially adjacent recesses 17 are free for greater axial flexure by the pressure fluid than are the outer portions 20 of bodies 15 which directly bear against plates 14.

Portions 20 of elastic bodies 15 preferably are of essentially the illustrated cross-sectional configuration, having radially outer cylindrical surfaces 21, and being of progressively increasing radial thickness as they approach axially toward their points of engagement with backing plates 14. Each of the elastic bodies 15 forms an annular sealing lip 22 projecting outwardly beyond the diameter of surfaces 21, and forming essentially outward continuations of walls 19. Lips 22 may be of the illustrated outwardly convex cross-sectional configuration and annularly engage the inner surface of cylinder 11 at two axially spaced locations in fluid tight sealing relation. Preferably, lips 22 project axially a short distance beyond the inner portions of the piston.

Referring now to Figs. 3 and 4, each of the backing plates may contain three of the previously mentioned circular openings 18 and may in addition have a circular portion 26 of a diameter corresponding to said openings 18 pressed or stamped axially to form a short circular lug to be received in one of the apertures 18 of the other backing plate. The three apertures 18 and lug 26 of each plate 14 are spaced apart 90° about the piston axis. When the piston is assembled, the lug 26 of each plate 14 is received within one of the apertures 18 of the other plate, to thus positively retain the plates in predetermined relation positions in which their other two pairs of apertures are in exact registry to pass fluid therethrough.

At their outer extremities, plates 14 have rigid annular flange portions 16 formed integrally therewith and extending in opposite axial directions at the outside of portions 20 of the elastomeric bodies in annular engagement therewith, to retain portions 20 against radial expansion. Flanges 16 have portions 116 which curve outwardly behind and in engagement with lips 22, to back up and prevent axial deflection of those lips. The radially inner extremities of the directly abutting radial portions of plates 14 form circular openings 27 slightly larger than shaft 12, and are held against one another and at fixed locations along the shaft by a pair of resilient metal snap rings 28. These snap rings are received within a pair of spaced annular grooves 29 in shaft 12, and are resiliently radially expansible to permit their movement along the shaft to said grooves during assembly. Snap rings 28 may be received within a space provided between rings 13, with bodies 15 desirably projecting into annular engagement with plates 14 radially outwardly of snap rings 28.

When the piston 10 of Fig. 1 is in use, the piston and rod 12 of course reciprocate axially within cylinder 11, with the annular engagement of lips 22 with the cylinder serving to prevent leakage of fluid axially past the piston. At some points during the operating cycle of the piston, considerable fluid pressure is exerted against one or both of the sides of the piston. If the piston constituted merely a solid plug of rubber or other elastomeric material, the exertion of such fluid pressure against one axial side of the piston would cause the rubber to expand radially outwardly against the wall of cylinder 11, so that the frictional drag on the piston would vary with the amount of pressure, and as the pressure increased might become sufficiently great to cause sticking or binding of the piston.

The special formation of my piston as shown in Figs. 1 to 5, overcomes this tendency of rubber bodied pistons, by providing for a counteracting radially inward force against the cylinder engaging lips 22. More specifically, assume the exertion of a very substantial fluid pressure downwardly against the upper side of piston 10, as indicated by the arrow 24 in Fig. 5. This downward force causes the radially extending wall 19 above the two recesses 17 to resiliently flex downwardly to a slight extent, as to the condition represented in Fig. 5, the flexure being permitted by the fact that the wall is of a flexible material and is axially opposite one of the recesses 17. Radially outwardly beyond wall 19, the upper of the two elastic bodies 15 has a portion 20 which bears against the upper rigid backing plate 14, and thus is less free for axial flexure or deflection than is wall 19. As a result of the fact that the portion of body 15 adjacent recesses 17 thus flexes axially to a greater extent than the outer portion 20 of that body 15, there is a tendency for the axial flexure of wall 19 to pull inwardly on the connected sealing lip 22. The material of body 15 and its various dimensions are so selected that this tendency for inward movement of lip 22 is just sufficient to counteract the opposite tendency for radial expansion of lip 22 outwardly against cylinder 11 such as must occur from the mere fact that fluid pressure is exerted axially against the flexible piston body. In a preferred form of the device the thickness of wall 19 and the other dimensions of the various parts may have the same proportions shown in Figs. 2 and 5. The body 15 may be of rubber having a hardness between about 65 and 75 Shore, preferably about 65 Shore.

It is noted that the confinement of bodies 15 between lips 22 and flanges 16, and the positive bonding or attachment of the inner portions of bodies 15 to hub elements 13, serves to confine the bodies 15 in a manner facilitating the application of the above described stabilizing forces on lips 22. Also, the provisions for placing the two recesses 17 in communication through apertures 18 allows for communication of the slightly increased pressure in the upper recesses 17 as the result of flexure of the upper wall 19, to the lower recesses 17, with a resultant slight tendency to expand the lower body 15 when pressure is applied downwardly against the upper body 15, to thus automatically assure maintenance of an effective seal at the lower lip 22. Also, the increase in pressure within the lower recess acts to flex the lower wall 19 downwardly, which flexure tends of itself to actuate lower lip 22 slightly outwardly to form a good seal. The reverse action of course occurs when pressure is applied upwardly against the bottom of the piston. All in all, with a piston of the above described construction, lips 22 serve to form a very effective and tight fluid seal with cylinder 11 through a very wide pressure range, and without the development of any substantial frictional drag on the piston at any point in that pressure range.

Fig. 6 illustrates a variational form of the invention, which is utilized for forming a fluid tight seal with an axially or rotatively movable shaft 12b. The seal assembly 10b is mounted stationarily to an outer carrier body, which may comprise a cylindrical or tubular element 11b. As will be apparent, the seal assembly 10b is very similar to the piston shown at 10 in Fig. 1, except that the two elastic bodies 15b have their annular sealing lips 22b formed at the radially inner portion of the seal assembly, to be slidably engaged by the relatively movable shaft 12b, rather than having the lips formed at the outer extremity of the unit as in Fig. 1. Elastic bodies 15b are bonded to a pair of radially outer rigid rings 13b, which are pressed fits within tubular body 11b. Between one of the pairs of elements 13b and 15b, and the other pair of elements 13b and 15b, there are provided a pair of rigid radially extending backing plates 14b, containing apertures 18b for placing in communication the two inner annular recesses 17b within bodies 15b. Radially inwardly of the axially extending portions 20b of elastic bodies 15b, backing plates 14b have oppositely directed axial flanges 16b, which correspond essentially to flanges 16 of Figs. 1 to 5, except that flanges 16b retain elastic body portions 20b against radially inward movement, rather than radially outward movement as in the case of flanges 16 in Fig. 1. Flanges 16b of Fig. 6 have portions 116b which extend to positions of engagement with the back sides of lips 22b, and which act to back up and prevent axial deflection of those lips. The two plates 14b are held in positions in which their corresponding apertures 18b register by means of a pair of lugs 118b on the plates each projecting through one of the apertures 18b.

In using the seal structure shown in Fig. 6, the two sealing lips 22b annularly engage shaft 12b, and form an effective fluid tight seal with that shaft even though the latter may be moved. If an increased fluid pressure is applied to either the upper or lower side of seal unit 10b, that pressure tends to axially flex the radially extending wall 19b of a corresponding one of the elastic bodies 15b, and by such flexure tends to pull the connected seal lip 22b radially outwardly, to thus counteract the tendency of the lip to tighten inwardly about shaft 12b as a result of the increased pressure. Thus, as in the previous form of the invention, an effective but low friction seal is maintained over varying pressure conditions.

I claim:

1. A fluid sealing unit for forming an annular seal with a coacting member, said unit comprising two bodies of elastomeric material, two backing plates axially between said bodies, each of said bodies having a portion forming an essentially radially extending elastic wall to be exposed to pressure fluid at a side facing away from said plates and adapted to be flexed axially by the fluid, and each body having a second portion attached to one radial extremity of said radial wall and carrying a sealing lip for engaging said coacting member, said last mentioned portions of said bodies extending essentially axially toward said plates and being restrained by the plates against axial flexure to an extent such that said second portions are less free than said radial walls for axial flexure, whereby each of said radial walls when flexed applies a radial force to said second portion of the same body and to the carried lip in a direction away from said member to counteract the tendency for the fluid to press the body against said member, said plates having first radially extending portions between said bodies and having second flange portions integral with said first portions respectively and extending in opposite axial directions along said second portions of said bodies and confining said second portions of the bodies against flexure radially toward said member.

2. A fluid sealing unit as recited in claim 1, in which said first portions of said plates contain registering apertures placing in communication a pair of recesses in said bodies respectively adjacent said radial walls, there being means retaining said plates in predetermined relative rotary positions in which said apertures are in registry.

3. A fluid sealing unit as recited in claim 2, in which said last mentioned means comprise interfitting means on said plates retaining them in said predetermined relative positions.

4. A fluid sealing unit as recited in claim 1, in which said flanges have portions engaging inner sides of and axially supporting said sealing lips.

5. A piston type fluid sealing unit to be mounted for axial movement within a tubular structure, comprising two rigid backing members, two bodies of elastomeric material at opposite axial sides of said backing members, each of said bodies containing a recess and having a portion defining an essentially radially extending axially flexible wall at one side of the recess and exposed to pressure fluid at a side away from the recess, each of said bodies having a radially outer portion outwardly of said recess carrying a sealing lip annularly engageable in sealing relation with said tubular structure, said outer portions of said bodies extending generally axially toward said backing members and being axially supported thereby, whereby fluid pressure against either of said bodies axially deflects said flexible wall portion thereof more than said outer portion, to thereby apply an inward force to said outer portion and the lip tending to counteract the tendency for radial expansion by the fluid pressure, said backing plates having first radially extending portions between said bodies and having second flange portions integral with first portions respectively and extending in opposite axial directions along the outside of said radially outer portions of said bodies to confine said outer portions against radial expansion.

6. A piston type fluid sealing unit as recited in claim 5, in which said first portions of said plates contain registering apertures placing said recesses in the two bodies in communication, there being means retaining said plates in predetermined relative rotary positions in which said apertures are in registry.

7. A piston type fluid sealing unit as recited in claim 6, in which said last mentioned means comprise interfitting means on said plates holding the plates in said relative positions.

8. A piston type fluid sealing unit as recited in claim 6, in which said last mentioned means comprise deformed portions on each of said plates forming short circular lugs each receivable within a circular opening in the other plate.

9. A piston type fluid sealing unit as recited in claim 5, including a rod extending through and carrying said bodies and plates, and a pair of snap rings on the rod at opposite axial sides of said plates retaining said plates together.

10. A piston type fluid sealing unit as recited in claim 9, including a pair of tubular hub elements carried about said rod at opposite sides of said plates and snap rings and bonded to inner portions of said bodies respectively.

11. A piston type fluid sealing unit as recited in claim 10, in which said rod contains a pair of spaced grooves receiving said snap rings, said hub elements being pressed fits on said rod.

12. A fluid sealing unit as recited in claim 11, in which said flanges have annular portions curving radially outwardly in engagement with said lips respectively to axially support the lips.

13. A fluid sealing unit as recited in claim 5, in which said flanges have portions engaging and axially supporting said sealing lips.

References Cited in the file of this patent

UNITED STATES PATENTS 2,709,118    Martin _____ May 24, 1955